United States Patent [19]

Maulandi

[11] Patent Number: 4,514,025
[45] Date of Patent: Apr. 30, 1985

[54] LOW RESISTANCE ELECTRICAL CONNECTOR

[75] Inventor: Aymon A. Maulandi, Cedar Rapids, Iowa

[73] Assignee: Square D Company, Palatine, Ill.

[21] Appl. No.: 440,137

[22] Filed: Nov. 8, 1982

[51] Int. Cl.³ ...................... H01R 21/28; H01R 11/22
[52] U.S. Cl. ............................. 339/64 M; 339/64 R; 339/252 R
[58] Field of Search ............. 339/64 R, 64 M, 252 R, 339/252 P, 252 S, 255 P

[56] References Cited

U.S. PATENT DOCUMENTS

| 1,864,989 | 6/1932 | Maag-Eckerifelder | 339/252 P |
| 3,566,335 | 2/1971 | Powell | 339/252 P |
| 3,909,573 | 9/1975 | Wilson | 339/64 R X |
| 4,188,516 | 2/1980 | Patel et al. | 339/64 R X |
| 4,423,917 | 1/1984 | Scheingold | 339/64 M |

FOREIGN PATENT DOCUMENTS

| 866360 | 2/1953 | Fed. Rep. of Germany | 339/252 R |
| 866513 | 2/1953 | Fed. Rep. of Germany | 339/252 R |
| 923141 | 2/1955 | Fed. Rep. of Germany | 339/252 P |
| 1024136 | 2/1958 | Fed. Rep. of Germany | 339/64 |
| 275736 | 10/1964 | Netherlands | 339/252 |
| 516300 | 12/1939 | United Kingdom | 339/252 P |
| 1542102 | 3/1979 | United Kingdom | 339/252 R |

Primary Examiner—William R. Briggs
Attorney, Agent, or Firm—Larry I. Golden; Richard T. Guttman

[57] ABSTRACT

A low resistance electrical connector adapted to allow for various types of misalignment between conductors including a furcated terminal block which carries a plurality of adjustable wafers that include a bevelled forward surface. Each wafer includes a recessed top and bottom channel as well as opposite lateral channels. Helical contact members are positioned in grooves provided in the top and bottom channels to provide electrical connection between the wafer and the terminal. Similar contact members are carried in the lateral channels of each wafer for engagement with a female connector.

13 Claims, 8 Drawing Figures

LOW RESISTANCE ELECTRICAL CONNECTOR

BACKGROUND OF THE INVENTION

Field of the Invention

This invention relates to an improved low resistance electrical connector and more particularly to a high current low resistance electrical connector which is adapted to allow for misalignment of the conductors upon connection. Heretofore, various types of low resistance electrical connectors have been used for carrying high currents such as 400 amperes and above. Some of these connectors use coil springs which provide multiple current paths as described in copending application Ser. No. 200,814, filed Oct. 27, 1980 by Ferdinand E. Chabot and assigned to the same assignee as the instant application. Another example of coil spring contact is described in copending application Ser. No. 315,566 filed Oct. 27, 1981 by Bernard Rickman covering An Improved Drawout Circuit Breaker which is also assigned to the same assignee as the present invention. The instant invention utilizes coil spring contact in a unique manner to provide an improved connector as hereinafter described.

SUMMARY OF THE INVENTION

This invention provides a readily assembled connector for making an electrical connection between, for example, a circuit breaker and the feeder or load conductors to which it is connected. A plurality of extruded wafers are carried by each terminal of the circuit breaker. Each wafer having a top and bottom surface with an extruded channel as well as opposite side surfaces, each side surface also including an extruded channel. Helical springs are retained in the channel of each extruded surface which provide a multiplicity of contact points between either the wafer and terminal or between the wafer and feeder or load conductor. Sufficient clearance is provided between the top and bottom channel side walls of the wafer and the side surfaces of the terminal to permit adjustment of the wafer to provide good electrical contact between the terminal and a respective female connector via the wafer. Clearance is also provided between the central connecting portion of the wafer and the terminal as well as between the lateral surfaces of the wafer and the female connector to permit limited rotational adjustment of the wafer. Accordingly, the adjustable wafer provides a higher degree of freedom with respect to tolerances than conventional two-part jaw and stab plug-in connectors. The present design compensates for lateral and angular or rotational misalignment between the terminal and the female connector into which it is plugged.

It is, accordingly, among the various objects of this invention to provide an improved, more reliable, low resistance electrical connecting assembly adapted to carry 400 or more amperes.

It is also an object of this invention to provide a connector which has a lower resistance and induces less of a temperature drop across the connectors than comparable traditional connectors utilizing copper fingers.

It is a further object of this invention to facilitate connection which allows for parallel and angular misalignment between the two conductors being connected.

Other objects and advantages will become apparent from the following specification and drawings together with the claims.

DESCRIPTION OF PREFERRED EMBODIMENT

Figure 1:
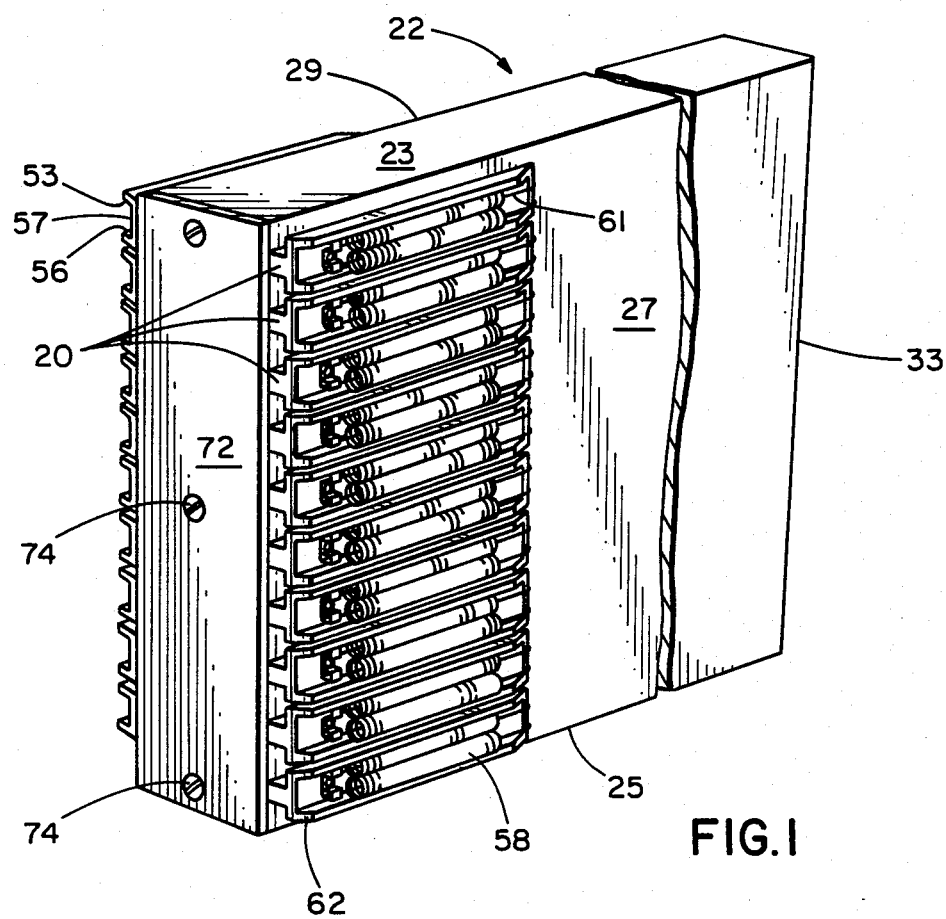
FIG. 1 is a perspective view of the improved connector assembly.
Figure 2:
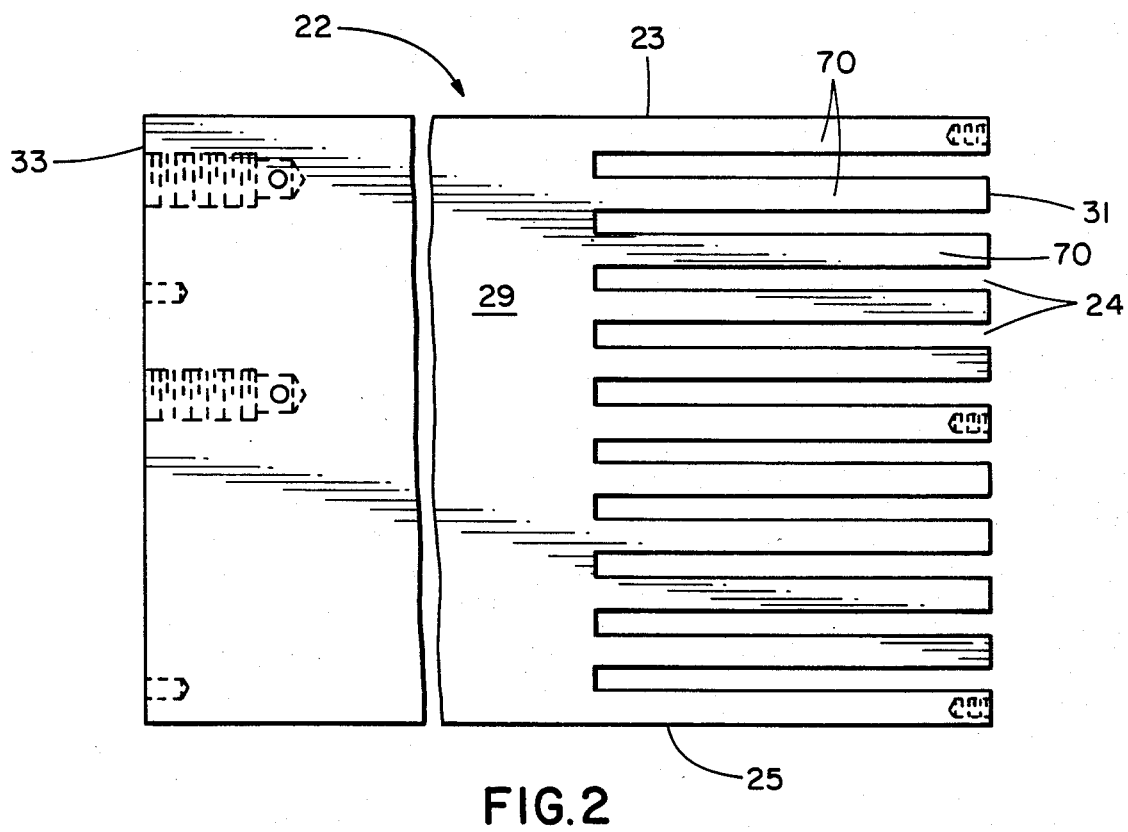
FIG. 2 is a side view showing the terminal block of the connector assembly.
Figure 6:
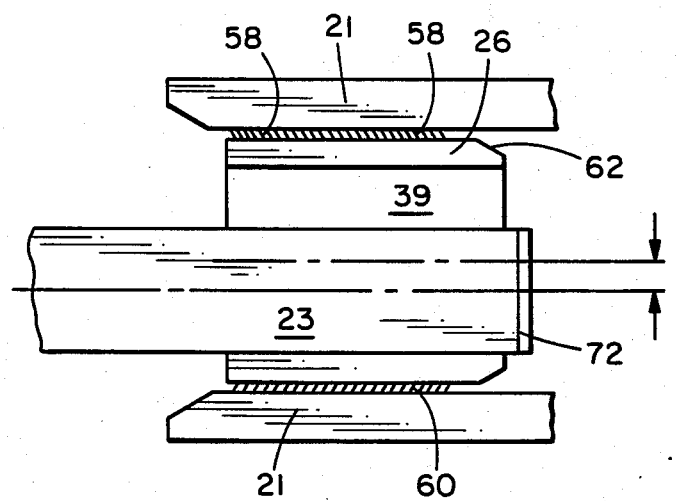
FIG. 6 is a partial top view of the connector assembly adjusted for lateral parallel misalignment.
Figure 7:
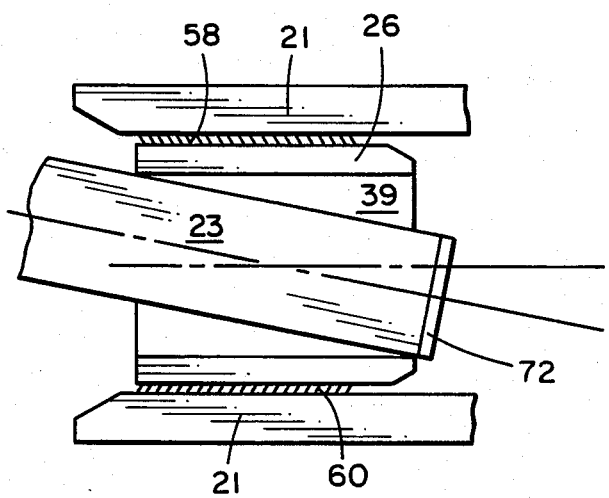
FIG. 7 is a partial top view of the connector assembly showing the wafer adjusted for lateral angular misalignment.

The low resistance electrical connecting assembly in accordance with this invention may be embodied as shown in FIG. 1 of the Drawings wherein a plurality of extruded wafers 20 are carried by a terminal block 22 which extends from a 3000 ampere rated circuit breaker for plug-in connection with a female connector 21 such as a feeder or load conductor shown partially in FIGS. 6 and 7. The terminal block is a generally rectangular conducting block which includes a top surface 23, a bottom surface 25, opposite side surfaces 27 and 29 and opposite end surfaces 31 and 33. As can be seen in FIG. 2, the terminal block is provided with a series of slots 24 which can be milled from a block of copper or provided by stacking copper laminations. The number and length of the slots are determined by the desired resistance of the connector as well as the requisite amount of current withstandability. The following description of the connector assembly includes approximate dimensions for the connector suited for a 3000 ampere rated circuit breaker. The present terminal block is an 8.8 inch×4 inch×1 inch rectangular block of silver plated copper with ten 0.156 inch slots 24 extending 2.6 inches inward from end surface 31. The block could also be made of silver plated aluminum or some other suitable conducting material.

Figure 3:
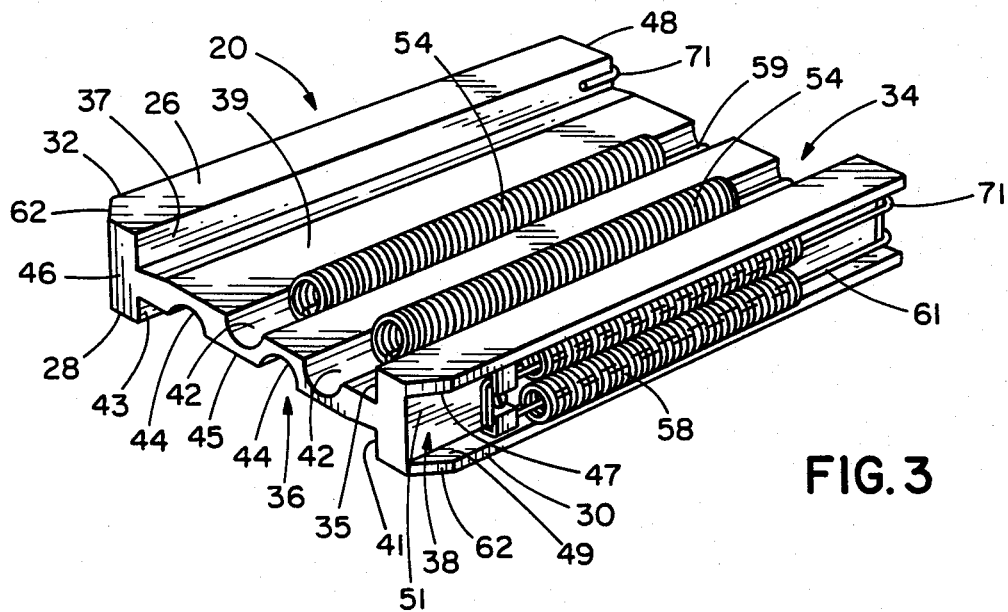
FIG. 3 is a perspective view of the wafer incorporated in this connector assembly.
Figure 4:
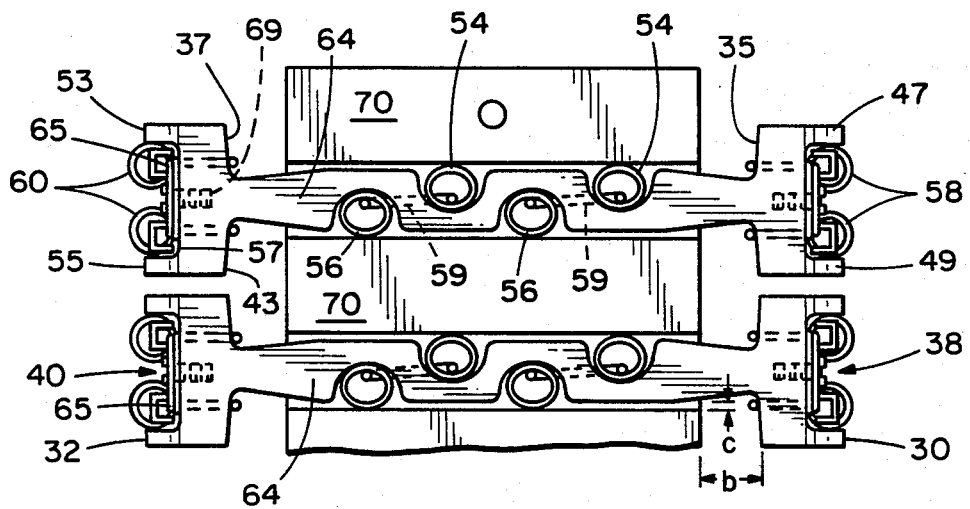
FIG. 4 is a partial front end view of the connector assembly with the cover removed.
Figure 8:
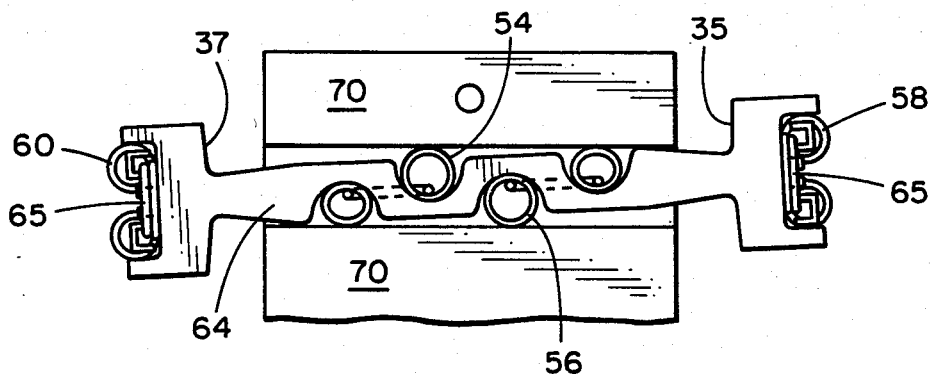
FIG. 8 is a partial front end view of the connector assembly with the cover removed showing the wafer adjusted for rotational misalignment.

The extruded wafer 20, best shown in FIG. 3, includes top and bottom surfaces 26 and 28 respectively and opposite side or lateral surfaces 30 and 32. The wafer has an overall length of 2.5 inches and a width from side surface 30 to opposite side surface 32 of 1.6 inches. Channels 34 and 36 are respectively extruded from the top and bottom surfaces of the wafer while channels 38 and 40 are extruded from the opposite side surfaces 30 and 32 of the wafer. As shown in FIG. 4, channels 34 and 36 are slightly convex, the most recessed portions of the channels being recessed approximately 0.125 inches from the respective top and bottom surfaces 26 and 28 of the wafer which are themselves separated by 0.35 inches. The slight curvature provided in top and bottom channels 34 and 36 facilitates side to side rocking motion of the wafer within the slot which self adjusts the wafer to allow for rotational misalignment between conductors as shown in FIG. 8. Extruded channel 34 includes opposite side walls 35 and 37 with recessed surface 39 extending therebetween. Similarly, channel 36 includes opposite side walls 41 and 43 with recessed surface 45 extending therebetween. Recessed surfaces 39 and 45 are spaced apart by 0.135 inches along the longitudinal axis of the wafer, which separation tapers off to 0.1 inch toward the lateral sides of the wafer to facilitate the rocking motion previously mentioned.

Channel 38 includes side walls 47 and 49 with recessed surface 51 extending therebetween while channel 40 includes side walls 53 and 55 with recessed surface 57 extending therebetween. An end view of the wafer, as seen in FIG. 4, shows the wafer assumes a generally H shape, having opposite side legs and a connecting central bar portion 64. Walls 47, 49 and 53, 55 extend perpendicularly outward approximately 0.08 inches from the respective surfaces 51 and 57 to form the lateral channels 38 and 40. The wafer is silver plated aluminum which has been copper flashed, although it could also be silver plated copper.

A pair of parallel grooves 42 extend throughout the length of surface 39 while a second pair of parallel grooves 44 are provided throughout the length of surface 45 in offset relationship to top grooves 42. Both pairs of grooves extend from a front surface 46 of the wafer to a rear surface 48 of the wafer and have a depth of approximately 0.1 inch. The top grooves are engaged by helical contact elements 54 while the bottom grooves are engaged by helical contact elements 56. The contact elements are made from 0.014 inch diameter coiled cadmium copper that has been plated with silver. The elements 54 and 56 are formed by unwinding a number of central coils of a helical coil having sufficient length to provide requisite contact on the top and bottom sides of the wafer. A 3.6 inch length of coil having an outer diameter of 0.14 inches is preset to have a skewed height of 0.125 inches which extends the length to 3.9 inches. The preset is obtained by skewing the coil to a height of 0.107 inches and releasing. The central portion of the helical coil 59 is then unwound and the coils are hung over the rear surface 48 of the wafer so that each coil portion is aligned with a respective groove and the coils are skewed with their top surface toward the front surface 46 of the wafer. The wafer is then inserted, rear surface 48 first, into a respective slot 24 of terminal 22.

Lateral channels 38 and 40 respectively carry helical contact elements 58 and 60. The helical contact elements 54, 56, 58 and 60 are generally of the type described in previously referenced copending application Ser. No. 200,814. Each of the lateral contact elements 58 and 60 is retained by a steel guide needle 61 which extends longitudinally through the centers of the contact coils. The double rowed coils 58 and 60 on each lateral side of the wafer extend approximately 1.5 inches. The guide needle includes two 90 bends about its center forming a pair of closely spaced parallel legs 63 extending in the same direction away from a bridge portion 65 of the needle. The needle is retained in the lateral channel by a double arched clip 67 which is fastened intermediate its arches by a driving screw 69 that is driven into the lateral channel of the wafer. The clip is formed of cold rolled steel although there is no need for the clip to be a conductor. Helical contact elements 58 and 60 are each formed from 0.016 inch diameter coiled cadmium copper plated with silver which has been uncoiled at its center to provide a central connecting portion which tracks the bridging portion of needle 61. Clip 67 captures each leg of the needle adjacent the bridge portion together with corresponding portions of the connecting portion of the contact element which follows the bridge portion. A turnabout 71 is provided at the distal end of each leg 63 which serves to secure the needle about the legs of the wafer. The end of each leg of the needle is wrapped around the rear surface 48 of the wafer leg and into a respective top or bottom channel of the wafer.

As can be seen in FIG. 3, side surfaces 30 and 32 are bevelled adjacent the front surface 46 to facilitate side adjustment of the wafer during insertion of the terminal into the feeder or load connector which has fingers separated by 1.625 inches. The bevelled surfaces 62 provide a guide to facilitate connection of the terminal with the feeder or load conductor which may also have a bevelled forward surface as shown in FIGS. 6 and 7.

The central connecting portion of coils 58 and 60 are respectively fastened to opposite sides of the wafer at a point adjacent the front surface of the wafer, enabling the seriate coils of the double rowed contact elements 58 and 60 to slide along the steel needle inside its respective channel upon connection of the terminal to the feeder or load conductors. Each lateral coil 58 and 60 is preset to a skewed position prior to assembly of the connector. The coils which have an initial outer diameter of 0.120 are pressed to within 0.087 inches and then released to obtain a preset at approximately 0.1 inch. Accordingly, the coils extend past the plane of the respective side surfaces 30 and 32 to provide electrical contact between the wafer and an engaged female connector. These coils are fastened to the wafer with their top end skewed toward the rear surface 48 of the wafer to facilitate connections with the female connector.

Each slot 24 of the terminal receives a connecting wafer 20 which is shown in FIG. 4 as having a generally H-shaped cross-section. The central bar portion 64 of each wafer is received within slot 24.

The outermost extending portion of terminal block 22 includes fingered layers 70 which define slots 24. Each layer, as shown in FIG. 4, has a rectangular cross-section having a height of approximately 0.22 inch and a width of approximately 1 inch. Each of the layers is spaced from its adjacent layer by approximately 0.156 inches which is the width of the slot. The central bar portion of the wafer extends a distance of approximately 1.2 inches between the opposite side walls 35 and 37 or 41 and 43 of the top and bottom channels. Accordingly, in the ideally aligned position as shown in FIG. 4, the helical contact members 54 and 56 provide electrical connection between the wafer and the extending terminal bar portions 70 while spacing the wafer equidistant between the two extending terminal portions a distance of approximately 0.01 inch. A clearance of approximately 0.1 inch is provided on each side of the wafer between the side wall of the terminal and the side walls of the top and bottom channels.

The helical coils in the lateral channels make electrical contact between the wafer and the female connector (feeder) or load conductors. The connection is completed to the terminal through the helical coils carried in the top and bottom channels of the wafer.

Figure 5:
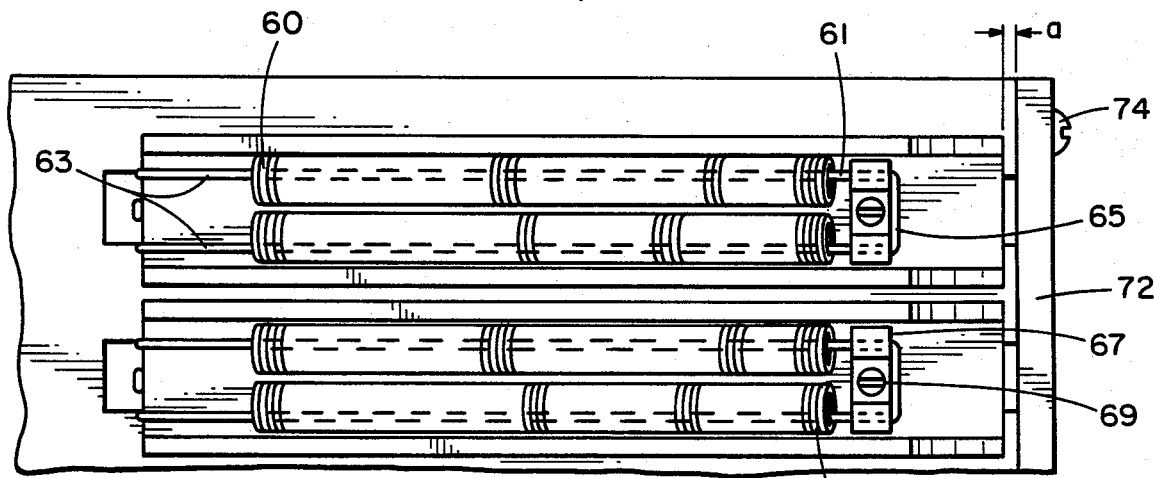
FIG. 5 is a partial side view of the connector assembly.

The wafers are retained in their slots by a front cover 72 which is fastened to the front end of the terminal as shown in FIG. 5 by screws 74 which are threadingly received by layer portions 70 of block 22 or by some similar fastening means. A clearance of approximately 0.1 inch is provided between the front surface 46 of wafer 20 and the front cover 72. For reference purposes, the clearance between the front surface of wafer 20 and the front cover will be identified by a, the clearance between the side of the extending terminal portion and the side walls of the top and bottom channels will be identified by b and the clearance between the central bar portion of the wafer and the contact surfaces of the extending terminal portions will be identified by c. Clearances a, b and c are provided on this unique connector to provide a self adjusting wafer that maintains good electrical contact between the terminal and the feeder or load conductor despite several types of misalignment between the terminal and the female connector.

The instant connector compensates for lateral parallel misalignment as well as angular misalignment in many directions. As shown in FIG. 6, clearance b provides for lateral-parallel misalignment between terminal 22 and feeder 23. The wafer is adjusted upon insertion to provide a good contact connection despite misalignment between the terminal and feeder. Adjustment is made when the bevelled surface 62 of the wafer meets a similarly bevelled frontal surface on the feeder or load conductor. The terminal can of course be misaligned by the distance equal to clearance b in either direction, providing a tolerance of 2b in the positioning of the terminal which would facilitate proper connection.

The wafer is also adapted to accommodate many types of angular misalignment. As shown in FIG. 7, the wafer need not be uniformly repositioned to place the side walls of the top and bottom channels in parallel relation to the side walls of the terminal. Clearances a and b permit adjustment of wafer position to compensate for misalignment. In this Figure, the wafer is shown angularly rotated to provide the front portion of side walls 37 and 43 in contact with the side terminal surface and the rear portion of side walls 37 and 43 away from the side terminal surface.

FIG. 8 shows angular or rotational misalignment which is compensated for by clearance c. In this situation, the side walls of the terminal are not parallel to the side walls of the feeder. Contact elements 54 and 56 continue to provide good electrical connection between the wafer 20 and the terminal 22 while contact elements 58 and 60 maintain electrical connection between the wafer and feeder or load conductor.

A joint compound is applied to the helical contact members 54, 56, 58 and 60 of the assembly. In this case, a silicone lubricating product sold by GE as Versilube G 351 M is applied to the spring contact elements. This facilitates ready engagement of the contact elements while resisting oxidation and fostering heat transfer.

The connector assembly hereinabove described has been found to provide lower resistance than a traditional copper finger connector of the same size. Because the instant connector is self adjusting, circuit breakers and other electrical equipment which may be of the drawout type, are provided additional tolerance within which good electrical connection will still be maintained.

While the invention has particularly been shown and described with reference to a preferred embodiment it will be understood by those skilled in the art that variations in form, construction and arrangements may be made therein without departing from the spirit and scope of the invention. All such variations are intended to be covered in the appended claims.

I claim:

1. An electrical connecting assembly adapted for plug-in connection to a female conductor, said assembly comprising:
    a terminal block portion including a first end adapted for insertion into said conductor, said terminal block having a top terminal surface, a bottom terminal surface and opposite side terminal surfaces;
    a wafer carried by said terminal block intermediate said top terminal surface and said bottom terminal surface;
    said wafer including opposite side wafer surfaces spaced outward from the respective side terminal surfaces;
    first resilient contact means positioned intermediate said wafer and said terminal block for providing electrical connection between said wafer and said terminal block while enabling relative motion between said wafer and said terminal block;
    second resilient contact means associated with at least one of said wafer side surfaces for providing electrical connection between said wafer and said female conductor; and
    retaining means for retaining said wafer intermediate said top terminal surface and said bottom terminal surface.

2. An electrical connecting assembly as claimed in claim 1 wherein said terminal block portion includes a horizontally extending slot providing a passage through said terminal block portion from one side terminal surface to the other side terminal surface;
    said wafer being retained within said slot.

3. An electrical connecting assembly as claimed in claim 1 wherein said terminal block includes a bifurcated first end providing spaced apart generally rectangular fingered layers,
    said wafer carried between said layers, and
    a retaining cover connected to the first end of said terminal block bridging the space between said layers and retaining said wafer therebetween.

4. An electrical connecting assembly as claimed in claim 1 wherein said terminal block includes a furcated first end providing a plurality of spaced apart generally rectangular fingered layers,
    a wafer element carried between each of said fingered layers,
    said retaining means comprising a retaining cover connected to the first end of said terminal block bridging the space between said layers and retaining each wafer intermediate a respective pair of said layers.

5. An electrical connecting assembly as claimed in claim 2 wherein said wafer has a generally H-shaped cross-section, said side wafer surfaces providing a pair of opposite legs, a central bar portion connecting said legs, said central bar portion being received in said slot;
    each leg portion of said wafer being spaced a predetermined distance outward from its respective adjacent side terminal surface facilitating limited transverse movement of said wafer with respect to said terminal.

6. An electrical connecting assembly as claimed in claim 5 including a pair of rail members extending perpendicular to each side wafer surface adjacent the distal ends of the legs, said rails including a bevelled portion adjacent the forward surface of said wafer, said second resilient contact means being retained intermediate each pair of rail members.

7. An electrical connecting assembly adapted for plug-in connection to a female conductor, said assembly comprising:
- a generally rectangular block conductor having a first end adapted for plug-in connection to said female conductor and a second end adapted for electrical connection to an other conductor, said block conductor also having opposite side surfaces;
- said first end of said conductor including a plurality of slots providing a series of fingered layers;
- a wafer received in each slot;
- each wafer having opposite side portions extending outward from said opposite side surface;
- first contact means positioned intermediate said wafer and said conductor for providing electrical contact between said wafer and said conductor while permitting relative motion between said wafer and said conductor;
- second contact means associated with at least one of said wafer side surfaces for providing electrical contact between said wafer and said female conductor.

8. An electrical connecting assembly as claimed in claim 7 wherein said wafer includes portions defining a top channel and a bottom channel,
- said channels each receiving a respective one of said layers.

9. An electrical connecting assembly as claimed in claim 8 wherein said side portions of said wafer include portions defining opposite side channels, said side portions of said wafer being bevelled adjacent the first end of said block conductor to facilitate connection with said female conductor.

10. An electrical connecting assembly as claimed in claim 9 wherein a longitudinally extending groove is provided in said top channel and said bottom channel; and said first contact means comprises a helical contact coil wrapped over said wafer and engaged with said top and bottom grooves.

11. An electrical connecting assembly as claimed in claim 10 wherein said second contact means comprises a double rowed helical coil secured adjacent to the first end of said wafer on each opposite side of said wafer.

12. An electrical connecting assembly as claimed in claim 11 wherein said double rowed helical coil comprises a single coil having an uncoiled central portion adjacent said first end of said wafer, said assembly including a double legged needle having each leg extending through a respective row of said coil and including a turnabout at the end of each leg extending into a respective one of said top and bottom channels.

13. An electrical connecting assembly as claimed in claim 12 including a double arched clip fastened to each side portion of said wafer, a respective leg of said needle and a portion of said uncoiled coil being retained by each arch of said clip.

* * * * *